US012758957B2

(12) United States Patent
Silversand

(10) Patent No.: US 12,758,957 B2
(45) Date of Patent: Oct. 13, 2026

(54) CATALYTICALLY ACTIVE PRODUCT AND A METHOD OF PRODUCING SUCH A CATALYTICALLY ACTIVE PRODUCT

(71) Applicant: Catator AB, Lund (SE)

(72) Inventor: Fredrik Silversand, Löddeköpinge (SE)

(73) Assignee: Catator AB, Lund (SE)

( * ) Notice: Subject to any disclaimer, the term of this patent is extended or adjusted under 35 U.S.C. 154(b) by 479 days.

(21) Appl. No.: 18/566,763

(22) PCT Filed: Jun. 9, 2022

(86) PCT No.: PCT/SE2022/050563
§ 371 (c)(1),
(2) Date: Dec. 4, 2023

(87) PCT Pub. No.: WO2022/265559
PCT Pub. Date: Dec. 22, 2022

(65) Prior Publication Data

US 2024/0207834 A1 Jun. 27, 2024

(30) Foreign Application Priority Data

Jun. 14, 2021 (SE) .................................... 2150760-3

(51) Int. Cl.
*B01J 37/02* (2006.01)
*B01J 35/40* (2024.01)
(Continued)

(52) U.S. Cl.
CPC ........... *B01J 37/0201* (2013.01); *B01J 35/40* (2024.01); *B01J 35/60* (2024.01); *B01J 37/0081* (2013.01);
(Continued)

(58) Field of Classification Search
CPC .......... B01D 53/864; B01D 2255/1023; B01D 2257/7027; B01D 2257/708;
(Continued)

(56) References Cited

U.S. PATENT DOCUMENTS 5,980,843 A 11/1999 Silversand
2008/0286163 A1 11/2008 Garfield et al.
(Continued)

FOREIGN PATENT DOCUMENTS

WO 1996026006 A1 8/1996
WO 1997002092 A1 1/1997

*Primary Examiner* — Brian A Mccaig
(74) *Attorney, Agent, or Firm* — Capitol City TechLaw

(57) ABSTRACT

A method of producing a catalytically active product (10) is disclosed. The method comprises providing a substrate (11) and depositing a first material (12) and particles (13) of a second material on the substrate, wherein the particles (13) of the second material have a higher melting point than the first material (12). Then, the substrate (11) with the first material (12) and said particles (13) is heated to a temperature where the first material (12) is melted and the particles (13) of the second material are not melted, wherein the first material (12) and the particles (13) are adhered to the substrate (11), wherein particles (13) are partly embedded in the first material (12) and form a rough surface. A ceramic material is deposited on the rough surface formed by the particles (13) to form a ceramic layer (14) thereon, wherein a catalytically active material (16) id added to the ceramic layer (14). Disclosed is also a catalytically active product.

21 Claims, 3 Drawing Sheets

(51) Int. Cl.
*B01J 35/60* (2024.01)
*B01J 37/00* (2006.01)
*B01J 37/08* (2006.01)
*B01J 35/56* (2024.01)

(52) U.S. Cl.
CPC ........... *B01J 37/0225* (2013.01); *B01J 37/08* (2013.01); *B01J 35/56* (2024.01)

(58) Field of Classification Search
CPC ... B01D 2258/0283; B01J 23/40; B01J 23/44; B01J 35/40; B01J 35/56; B01J 35/60; B01J 37/0018; B01J 37/0081; B01J 37/0201; B01J 37/0217; B01J 37/0225; B01J 37/023; B01J 37/0232; B01J 37/0242; B01J 37/0244; B01J 37/0248; B01J 37/08
See application file for complete search history.

(56) References Cited

U.S. PATENT DOCUMENTS

2009/0176120 A1* 7/2009 Wang ........................ C23C 4/08 204/192.1
2015/0298114 A1 10/2015 Park et al.
2019/0224662 A1 7/2019 Byun et al.

* cited by examiner

CATALYTICALLY ACTIVE PRODUCT AND A METHOD OF PRODUCING SUCH A CATALYTICALLY ACTIVE PRODUCT

This application claims priority under 35 USC 119 (a)-(d) from SE patent application No. 2150760-3, which was filed on Jun. 14, 2021, the entire contents of which are incorporated herein by reference.

TECHNICAL FIELD

The invention relates to a catalytically active product and a method for producing the same. Catalytically active products are used for various chemical reactions, including combustion, purification, catalytic reforming, etc. For example, catalytically active products are used for purification of flue gases with respect to carbon monoxide and/or hydrocarbons, such as VOC and PAH. Such catalytically active products can be used in a reactor for various types of chemical reactions. Catalytically active products of this type can also be used in a burner for combustion of gaseous fuels, such as natural gas, propane, butylene or similar gases.

BACKGROUND

Over the past years, there has been an increased interest in the development of environmentally friendly processes related to the purification of exhaust and flue gas emissions. Various catalyzer devices have been presented over the years, all with the same goal of achieving effective cleaning of pollutants which are hazardous to both human health as well as the environment.

WO9702092A1 describes a catalyser and a method for producing the same, wherein a layer of porous ceramic layer is formed on a mesh substrate by thermal spraying followed by surface area enlargement of the ceramic layer and subsequent impregnation of the surface area enlarged ceramic layer with a catalytically active material. The purification result as well as the method of producing this known catalyzer is sufficient in many applications, but there is room for improvements in the methods of producing catalytically active products as well as for the catalytically active products per se.

One problem of methods for producing catalytically active products according to the prior art is that they are complicated and require expensive equipment.

Another problem of such prior art methods is that they consume considerable amounts of energy.

SUMMARY

An object of the present invention is to overcome or at least alleviate one or more of the problems described above in relation to prior art and provide an efficient method of producing a catalytically active product and also provide such a product which allows for facilitated production.

The present invention is related to a method of producing a catalytically active product, comprising the steps of:

a) providing a substrate, b) depositing a first material and particles of a second material on the substrate, wherein the particles of the second material have a higher melting point than the first material, c) heating the substrate with the first material and said particles to a temperature where the first material is melted and the particles of the second material are not melted and thereby adhering the first material and the particles to the substrate, wherein particles are partly embedded in the first material and form a rough surface, d) depositing a ceramic material on the rough surface formed by the particles to form a ceramic layer thereon, and e) adding a catalytically active material to the ceramic layer.

The method according to the invention results in an easy and efficient production of the catalytically active product. The present invention makes it possible to produce the catalytically active product without any thermal spraying process. The combination of the first material and the particles result in a safe, reliable and efficient securing of the ceramic layer to the substrate for the production of the catalytically active product.

The method can comprise the step of providing the first material and/or the particles of the second material as one or more suspensions, optionally both are provided in combination as a suspension. Hence, the first material and/or the second material can be deposited on the substrate in an efficient manner, such as by spraying or other coating process, wherein the suspension can be deposited at any suitable temperature, such as at room temperature. Hence, the first material can initially be deposited on the substrate without melting. Then, the method can include the step of heating the substrate with the first material and the particles of the second material thereon in a furnace, such as a vacuum furnace or with reducing or inert gas, for melting the first material only and adhere the first material to the substrate while securing the particles to the first material. Hence, the first material and the particles efficiently form an attachment layer for subsequent fastening of the ceramic layer, which can be produced in an efficient and reliable manner.

After securing the first material to the substrate by melting it, the method can comprise the step of depositing the ceramic layer by providing a ceramic material as a suspension and depositing the suspension onto the first material with the particles, e.g. by spraying. Hence, the ceramic material is formed in an easy manner and partially enclose the particles projecting from the first material to reliably secure the ceramic layer mechanically to the substrate, e.g. by drying and calcination.

The present invention is also related to a catalytically active product, comprising a substrate, a first material, particles of a second material having a higher melting point than the first material, a ceramic layer comprising a ceramic material adhered to the substrate through the first material and particles of a second material being partially embedded in the first material and projecting into the ceramic layer, wherein the ceramic layer is formed with a pore structure provided with a catalytically active material.

The substrate can comprise a metal, such as steel, aluminum, copper or other suitable metal. The substrate can be formed as a sheet or a mesh, such as a wire mesh or a perforated plate or similar, and can optionally be shaped into any suitable shape, including a cylinder shape. The first material can comprise a metal, such as a low melting metal or alloy. The first material can have a lower melting point than the substrate as well as the particles of the second material. The particles of the second material can comprise metal powder, ceramic powder or composites or mixtures thereof. The particles of the second material can have a particle size of 20-50 μm to provide efficient fastening to the first material and to the ceramic layer. By providing coarse high-melting particles in the layer of the low-melting first material, a larger surface area is created, leading to better adhesion of the ceramic layer to the substrate surface. Hence, the particles provide means for enhanced adhesion of the ceramic layer to the substrate.

Further characteristics and advantages of the present invention will become apparent from the description of the embodiments below, the appended drawings and the dependent claims

BRIEF DESCRIPTION OF THE DRAWINGS

By way of example, embodiments of the present invention will now be described with reference to the accompanying drawings, in which.

DETAILED DESCRIPTION OF THE EMBODIMENTS

Figure 1:
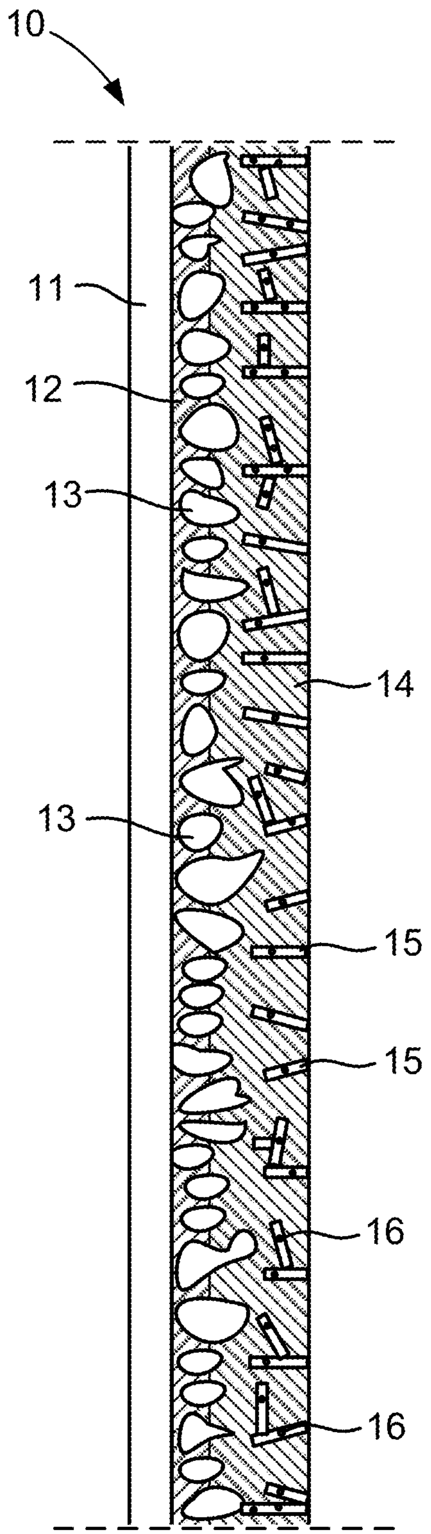
FIG. 1 is a schematic cross-section illustration of a catalytically active product according to the present invention.
Figure 2:
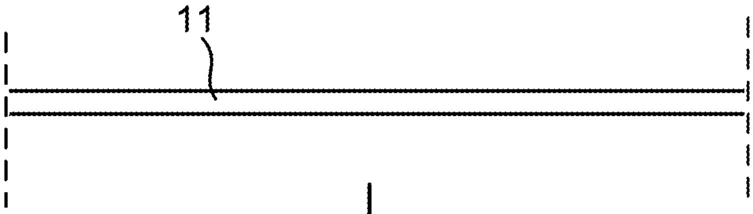
FIGS. 2-6 is a series of schematic cross-section illustrations of a method of producing the catalytically active product of FIG. 1 according to a first embodiment.

With respect to FIG. 1, a catalytically active product 10 is illustrated schematically according to the present invention. The catalytically active product 10 is configured to be used for promoting a chemical reaction. For example, the catalytically active product 10 is arranged for combustion, purification, catalytic reforming or similar. For example, the catalytically active product 10 is arranged for purification of flue gases with respect to carbon monoxide and/or hydrocarbons, such as VOC and PAH. For example, the catalytically active product 10 is arranged in a reactor vessel for a chemical reaction. Alternatively, the catalytically active product 10 is arranged in a burner for combustion of gaseous fuels, such as natural gas, propane, butylene or similar gases, e.g. for heating purposes.

The catalytically active product 10 comprises a substrate 11, a first material 12, particles 13 of a second material, a ceramic layer 14 comprising a ceramic material with pores 15, and a catalytically active material 16. The first material 12 and the particles 13 form an attachment layer on the substrate 11. For example, the first material 12 is arranged directly on top of the substrate 11, wherein the particles 13 are partially embedded in the first material 12 and projects from the surface thereof. The ceramic layer 14 is arranged on top of the attachment layer formed by the first material 12 and the particles 13, wherein the ceramic layer 14 engages the particles 13. Hence, the attachment layer formed by the first material 12 and the particles 13 is arranged between the substrate 11 and the ceramic layer 14.

In the illustrated embodiment, the substrate 11 has a substantially flat shape. However, the substrate 11 may be flat, cylindrical, curved, bent, or have basically any geometrical shape. For example, the substrate 11 is formed as a mesh structure, i.e. having a plurality of through holes. According to one embodiment, the substrate 11 is formed as a wire mesh. Alternatively, the substrate 11 is formed as a continuous sheet, a grid structure or similar. For example, the substrate 11 is or comprises a metal or an alloy. According to one embodiment, the substrate is made of steel, such as stainless steel, aluminum or copper. Alternatively, the substrate 11 is made of a polymer material, such as polytetrafluoroethylene or similar polymer or composite materials that can withstand relatively high temperatures. In general, the substrate 11 should be able to withstand temperatures of at least 350° C. In some cases, it should be able to withstand temperatures well above this level, such as at least 500° C., at least 700° C. or at least 900° C.

On top of the substrate 11, which forms a base structure, the the first material 12 is arranged. The substrate 11, or at least a portion or a side thereof, is coated with the first material 12. In the illustrated embodiment, a top surface of the substrate 11 is coated with the first material 12. Alternatively, the entire substrate 11 is coated with the first material 12. For example, the first material 12 is a metal or an alloy. For example, the first material 12 is Al or similar metal having a relatively low melting point. Alternatively, the first material 12 is an alloy comprising a metal, such as Ni, Cu, Fe and/or steel, and a melting point depressant.

The particles 13 are partially embedded in the first material 12 and project at least partially from it in a direction away from the substrate 11. The particles 13 are made of or comprises a second material having a higher melting point than the first material 12. For example, the solidus temperature of the particles 13 of the second material is higher than the liquidus temperature of the first material 12. For example, the particles 13 of the second material comprise metal powder, ceramic powder or mixtures thereof. The particles 13 may have different shapes and sizes. The particles 13 are provided in or on the first material 12 to add surface roughness which helps in the adhesion of the ceramic layer 14. For example, the particles 13 have a particle size of at least 10 μm, or at least 20 μm, such as 20-100 μm. For example, the second material has a porosity of at least 30%.

The ceramic layer 14 is provided on the attachment layer formed by the first material 12 and the particles 13 and is secured to it by means of the particles 13. Hence, particles 13 are partially embedded in the first material 12 and partially embedded in the ceramic layer 14 to mechanically fasten the ceramic layer 14 to the substrate 11. Hence, the ceramic layer 14 is arranged on top of the first material 12 and the particles 13 projecting from it. The ceramic layer 14 may comprise alumina, zirconia, titanium dioxide, silica, tungsten carbides, silicon nitrides or similar ceramics, or mixtures thereof. The ceramic layer 14 is formed with pores 15 providing an enlarged surface area for depositing the catalytically active material 16 therein. Hence, the ceramic layer 14 is provided with the catalytically active material 16, wherein catalytically active material 16 is arranged inside the pores 15 thereof. For example, the catalytically active material 16 is a noble metal, a transition metal or a mixture or an oxide thereof. For example, the catalytically active material 16 is palladium.

Figure 3:
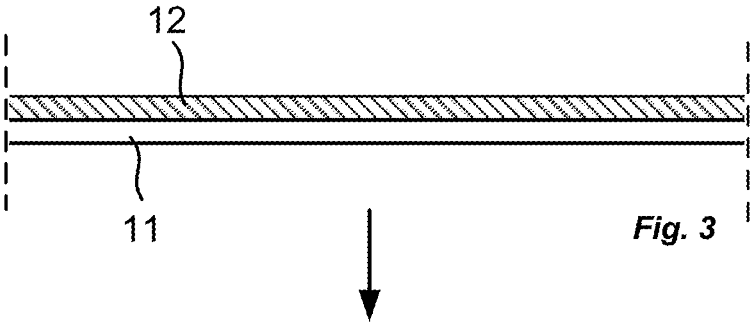

With reference also to FIGS. 2-6 a method of producing the catalytically active product 10 is illustrated schematically according to a first embodiment by means of a series of illustrations. The substrate 11 has been described above and is illustrated schematically in FIG. 2. The substrate 11 is coated with the first material 12, e.g. through a spraying process. The substrate 11 with the first material 12 is illustrated in FIG. 3, wherein the first material 12 is provided as a layer on the substrate 11. According to one embodiment, the first material 12 is provided as a suspension, wherein the first material 12 is provided as particles dispersed in a liquid, such as water. For example, the substrate 11 is coated with the first material 12 through a spraying process, wherein the first material 12 is sprayed onto the substrate 11, e.g. in room temperature. Hence, the first material 12 is not heated and is not sprayed at elevated temperatures. Alternatively, the first material 12 is applied on the substrate 11 by another coating process, such as painting, dipping or similar. Alternatively, the first material 12 is provided as a paste, which is applied onto the substrate 11 by spreading over the surface of the substrate 11. After applying the first material onto the substrate, the substrate 11 with the first material 12 is optionally dried, e.g. by heat treatment in an oven.

Figure 4:
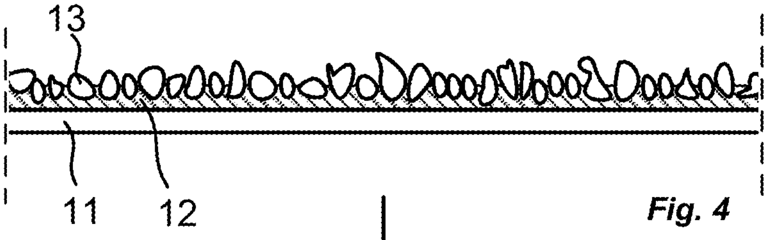

After coating of the substrate 11 with the first material 12, the particles 13 comprising the second material is provided on the first material 12, which is illustrated in FIG. 4. For example, the particles 13 are provided as a suspension, also called slurry, wherein the particles 13 are suspended in liquid, such as water. The suspension of the particles 13 is applied on the first material 12 carried by the substrate 11. For example, the particles 13 are applied onto the first material 12 through a spraying process, wherein the suspension with the particles 13 is sprayed on the first material 12. Hence, the particles 13 may be sprayed onto the first material 12 at room temperature. After applying the particles 13 onto the first material 12, the substrate 11 carrying the first material 12 and the particles 13 may be dried, e.g. in an oven. The substrate 11 with the first material 12 and the particles 13 is then heat treated, e.g. in a furnace, to a temperature, wherein the first material 12 is melted and the particles 13 of the second material are not melted. Neither is the substrate 11 melted. Hence, the first material 12 is secured to the substrate 11 by melting while securing the particles 13 to the first material 12. The particles 13 are secured to the first material 12 mechanically, wherein the particles 13 are partly embedded in the first material 12 after melting of the first material 12. The first material 12 is also adhered to the substrate mechanically by melting into a roughness of its surface. Particles 13 partly embedded in the first material 12 and projecting from it are illustrated in FIG. 4. For example, the heat treatment for melting the first material 12 is performed in a vacuum furnace under vacuum. Alternatively, the heat treatment for melting the first material 12 is performed in a furnace with reducing gas or an inert gas.

Figure 5:
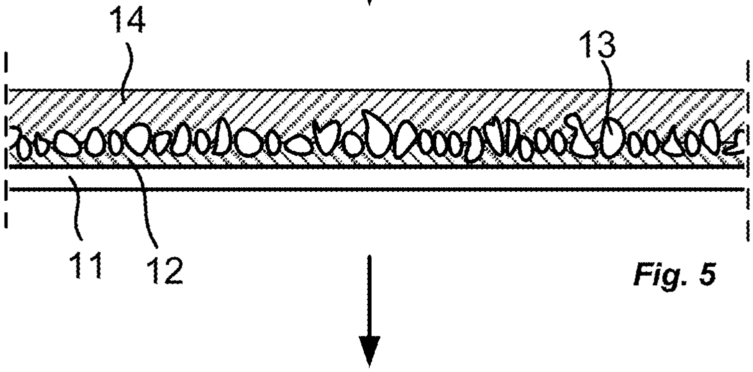
Figure 6:
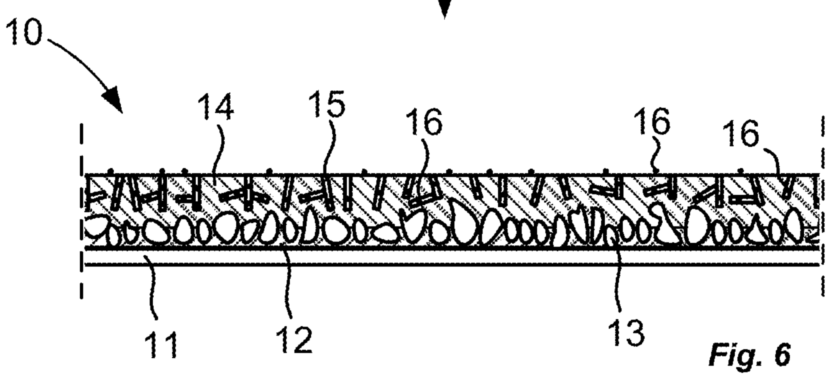

The substrate 11 carrying the first material 12 and the particles 13 is then provided with the ceramic layer 14, which is illustrated in FIG. 5, wherein the ceramic layer 14 is provided onto the particles 13 and the first material 12, so that the first material 12 is arranged between the ceramic layer 14 and the substrate 11. For example, the ceramic layer 14 is deposited onto the attachment layer 12 as a slurry, such as in the form of a water based suspension. The ceramic layer 14 may also contain a pore-forming agent which is provided to form a porous structure in the ceramic material. Typically, the thickness of the ceramic layer is in the range of 0.1-0.8 mm, preferably in the range of 0.2-0.5 mm. The ceramic layer 14 is surface enlarged by the pores 15, which are configured to hold the catalytically active material 16, which is illustrated in FIG. 6.

The ceramic layer 14 may be produced according the following process, 1) direct spraying together with secondary surface area enlargement through precipitation, or 2) spraying with simultaneous depositing of ceramic powder, or a combination of methods 1) and 2), followed by coating with a catalytically active material 16 through an impregnation process. Alternatively, the pore-forming agent may be a combustible material which may be combusted by heat treatment. Optionally, the pore-forming agent may be a pore-forming polymer material. Alternatively, the ceramic layer 14 is a ceramic powder containing particles with a high specific surface. For example, the pores 15 are formed in the ceramic layer 14 in a conventional manner.

The pores 15 of the ceramic layer 14 are configured to carry the catalytically active material 16. For instance, the pores 15 may be cylindrically shaped. This way, chemicals to be purified can easily reach the catalytically active material 16 of the catalytically active product 10. The catalytically active material 16 may be deposited in the pores 15 of the ceramic layer for instance through a conventional impregnation process. During impregnation, the structure of pores 15 of the ceramic layer 14 is, e.g. saturated with a solution containing the catalytically active material 16. The catalytically active material 16 may include noble metals, transition metals or combinations of these.

Figure 7:
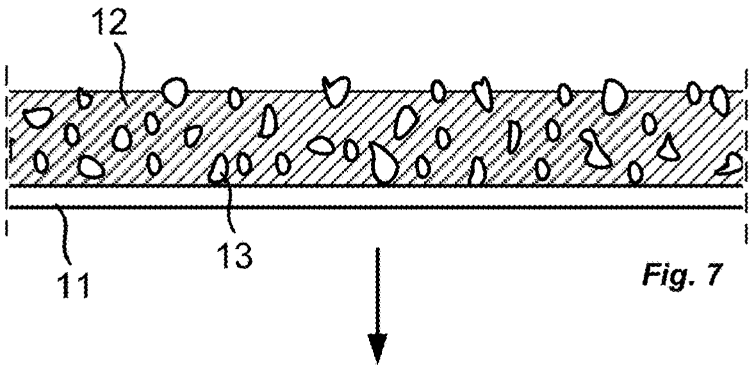
FIGS. 7-11 is a series of schematic cross-section illustrations of a method of producing the catalytically active product of FIG. 1 according to a second embodiment.
Figure 8:
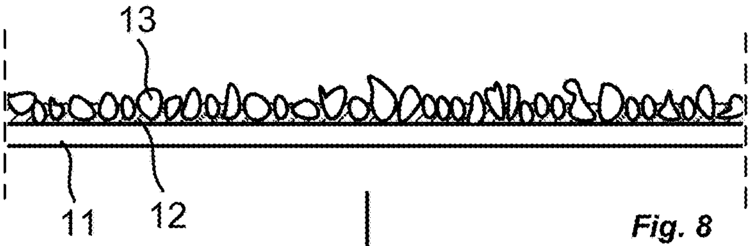
Figure 9:
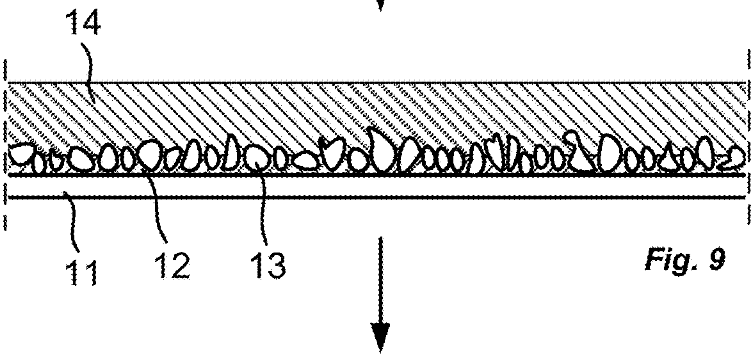
Figure 10:
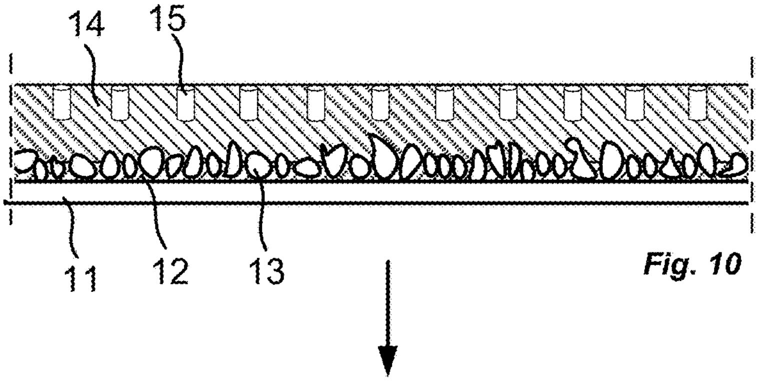
Figure 11:
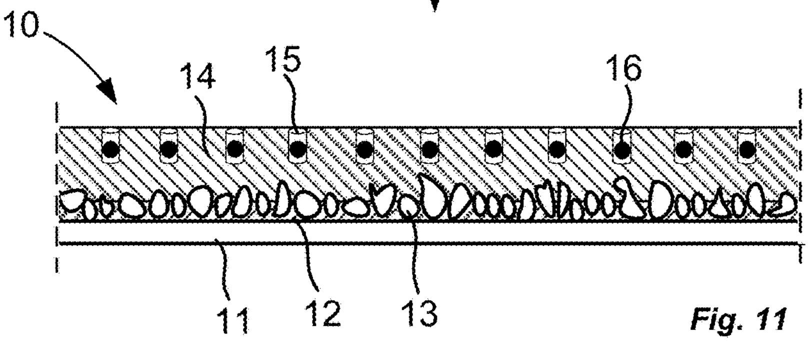

With reference to FIGS. 7-11 an alternative embodiment of the present invention is described, wherein the substrate 11 is coated with a mix of the first material and the particles 13 of the second material. The substrate 11 with the mix of the first material 12 and the particles 13 is illustrated in FIG. 7. For example, also the first material 12 is provided as particles, wherein the first material 12 and the particles 13 of the second material are provided as a mix in a slurry. The slurry comprising both the first material 12 and the particles 13 of the second material is applied on the substrate 11, e.g. by spraying, as described above. Hence, the slurry may be provided on the substrate by spraying in room temperature. Then, the substrate 11 with the slurry is optionally dried. After, coating the substrate 11 with the mixture of the first material 12 and the particles 13, it is heated to melt the first material 12 but not the substrate 11 or the second material, wherein the particles 13 are adhered to the first material 12 and the first material 12 is adhered to the substrate 11, as illustrated in FIG. 8. Hence, particles 13 are partially embedded in the first material 12 and project from it in a direction away from the substrate 11 to obtain a rough outer surface for securing the ceramic layer 14 as describe above. Then, the ceramic layer 14, which may be provided as a slurry, is deposited onto the first material 12 and the particles 13 as illustrated in FIG. 9. For example, the ceramic layer may be deposited by spraying as described above. Then, the ceramic layer 14 may be subjected to a surface area enlarging process to form the pores 15, as illustrated in FIG. 10. For example, the ceramic layer 14 contains a pore-forming agent. Finally, the catalytically active material 16 is deposited through for instance impregnation. The catalytically active material 16 may be deposited on the surface of the ceramic layer 14 and inside the pores 15 thereof.

The particles are provided in the first material 12 to add surface roughness which helps in the adhesion of a subsequently arranged ceramic layer 14. Put differently, by providing coarse particles in the first material 12, an enlarged surface for improved adhesion of the ceramic material 14 to the substrate 11 can be realized. When heated, the first material 12 is fused to the substrate 11 and the contained particles 13 are exposed. By exposing the particles 13 the ceramic layer 14 may be secured to the substrate 11. This is due to the enlarged surface area and roughness provided by the particles 13.

The invention claimed is:

1. A method of producing a catalytically active product, the method comprising:

a) providing a substrate;

b) depositing a first material and particles of a second material on the substrate, wherein the particles of the second material have a higher melting point than the first material;

c) heating the substrate with the first material and the particles to a temperature where the first material is melted and the particles of the second material are not melted and thereby adhering the first material and the particles to the substrate, wherein the particles are partly embedded in the first material and form a rough surface;

d) depositing a ceramic material on the rough surface formed by the particles to form a ceramic layer thereon; and e) adding a catalytically active material to the ceramic layer.

2. The method according to claim 1, further comprising, in b), providing the first material in the form of a suspension and spraying the first material onto the substrate.

3. The method according to claim 2, wherein the first material is sprayed onto the substrate at room temperature.

4. The method according to claim 1, comprising, in b), providing the particles of the second material as a suspension and spraying the suspension onto the substrate together with the first material or spraying the particles of the second material onto the first material provided on the substrate.

5. The method according to claim 4, wherein the particles of the second material are sprayed at room temperature.

6. The method according to claim 1, comprising, in c), heating the substrate with the first material and the particles of the second material in a vacuum and/or an inert gas and/or a reducing gas.

7. The method according to claim 1, comprising, in d), providing the ceramic material as a suspension and spraying the ceramic material onto the first material and the particles to form the ceramic layer.

8. The method of claim 7, wherein the ceramic material is sprayed at room temperature.

9. The method according to claim 1, comprising providing pores in the ceramic layer by an area enlargement process.

10. The method according to claim 9, wherein the area enlargement process includes precipitation, ceramic powder or combustion.

11. The method according to claim 1, including, in e), adding the catalytically active material to the ceramic layer by impregnation, dipping or spraying.

12. The method according to claim 1, wherein the substrate is a metal.

13. The method according to claim 1, wherein the first material is a metal or an alloy.

14. The method according to claim 1, wherein the particles of the second material comprise metal and/or ceramic powder or composites thereof.

15. The method according to claim 1, wherein the particles of the second material have a porosity of at least 30% and/or result in a roughness of at least 10 μm.

16. The method according to claim 1, wherein the catalytically active material includes a noble metal, a transition metal or mixtures or oxides thereof.

17. The method according to claim 1, further comprising a drying process between b) and c) and/or between depositing the first material and depositing the particles.

18. A catalytically active product, comprising:

a substrate;

a first material and particles of a second material having a higher melting point than the first material provided on the substrate;

a ceramic layer adhered to the substrate through the first material and the particles of the second material being partially embedded in the first material and projecting into the ceramic layer;

wherein the ceramic layer is formed with pores provided with a catalytically active material.

19. The catalytically active product of claim 18, wherein the substrate comprises a metal, the first material comprises a metal, and the particles of the second material comprise metal powder, ceramic powder or mixtures or composites thereof.

20. The catalytically active product of claim 18, wherein the catalytically active material includes a noble metal, a transition metal or mixtures or oxides thereof.

21. The catalytically active product according to claim 18, wherein the particles of the second material have a particle size of 20-100 μm.

* * * * *